United States Patent
Okemoto et al.

(10) Patent No.: US 12,188,873 B2
(45) Date of Patent: Jan. 7, 2025

(54) APPARATUS INCLUDING ANALYZER UNIT

(71) Applicant: ATONARP INC., Tokyo (JP)

(72) Inventors: Kazuo Okemoto, Tokyo (JP); Naoyuki Fukushima, Tokyo (JP); Prakash Sreedhar Murthy, Tokyo (JP)

(73) Assignee: ATONARP INC., Tokyo (JP)

( * ) Notice: Subject to any disclaimer, the term of this patent is extended or adjusted under 35 U.S.C. 154(b) by 39 days.

(21) Appl. No.: 17/600,871

(22) PCT Filed: Mar. 30, 2020

(86) PCT No.: PCT/JP2020/014547
§ 371 (c)(1),
(2) Date: Oct. 1, 2021

(87) PCT Pub. No.: WO2020/203969
PCT Pub. Date: Oct. 8, 2020

(65) Prior Publication Data
US 2022/0187211 A1  Jun. 16, 2022

(30) Foreign Application Priority Data

Apr. 3, 2019 (JP) ................................. 2019-071301

(51) Int. Cl.
*G01N 21/65* (2006.01)
(52) U.S. Cl.
CPC ..... *G01N 21/658* (2013.01); *G01N 2021/655* (2013.01); *G01N 2201/06113* (2013.01)
(58) Field of Classification Search
None
See application file for complete search history.

(56) References Cited

U.S. PATENT DOCUMENTS

| | | | |
|---|---|---|---|
| 2003/0211488 A1 | 11/2003 | Mirkin et al. | |
| 2004/0086897 A1* | 5/2004 | Mirkin ................. | G01N 33/583 436/526 |

(Continued)

FOREIGN PATENT DOCUMENTS

| | | |
|---|---|---|
| JP | 2005524849 A | 8/2005 |
| JP | 2012063294 A | 3/2012 |

(Continued)

OTHER PUBLICATIONS

International Search Report (PCT/ISA/210) with translation and Written Opinion (PCT/ISA/237) mailed on Jun. 23, 2020, by the Japan Patent Office as the International Searching Authority for International Application No. PCT/JP2020/014547.

(Continued)

*Primary Examiner* — Tarifur R Chowdhury
*Assistant Examiner* — Roberto Fabian, Jr.
(74) *Attorney, Agent, or Firm* — Buchanan Ingersoll & Rooney PC (57) ABSTRACT

There is provided an apparatus including a chip containing metal bodies capable of exciting localized surface plasmon resonance at a first surface, and an analyzer unit that performs a scan of the first surface of the chip, in a state where the first surface is in contact with a sample, with a laser in at least a one-dimensional direction and records scattered light, which has been enhanced at the first surface, in association with the scan. The chip includes a substrate, a first layer where concave and convex structures are repeatedly provided on the first surface of the substrate; and a second layer that contains the metal bodies and is provided via the first layer.

24 Claims, 6 Drawing Sheets

(56) References Cited

U.S. PATENT DOCUMENTS

| | | | | |
|---|---|---|---|---|
| 2008/0117416 | A1* | 5/2008 | Hunter | A61B 5/0066 356/301 |
| 2008/0130003 | A1* | 6/2008 | Kuroda | G01N 21/554 356/445 |
| 2009/0149344 | A1* | 6/2009 | Zhao | G01N 21/658 506/12 |
| 2012/0307238 | A1* | 12/2012 | Fujita | G02B 21/002 356/338 |
| 2013/0182248 | A1* | 7/2013 | Naya | G01N 21/648 250/459.1 |
| 2014/0125976 | A1* | 5/2014 | Kim | G01J 3/44 356/301 |
| 2015/0049332 | A1* | 2/2015 | Sun | G01N 21/658 977/881 |
| 2015/0223739 | A1* | 8/2015 | Walavalkar | H01L 27/14698 356/301 |

FOREIGN PATENT DOCUMENTS

| | | |
|---|---|---|
| JP | 2015152492 A | 8/2015 |
| JP | 2017040608 A | 2/2017 |
| JP | 2017181308 A | 10/2017 |
| WO | 2011099269 A1 | 8/2011 |

OTHER PUBLICATIONS

Notification of Transmittal of the International Preliminary Report on Patentability (PCT/IPEA/416) and International Preliminary Report on Patentability (PCT/IPEA/409) issued on Jul. 29, 2021, by the Japan Patent Office as the International Searching Authority for International Application No. PCT/JP2020/014547.

English translation of the International Preliminary Report on Patentability, by the Japanese Patent Office as the International Searching Authority for International Application No. PCT/JP2020/014547 (4 pages).

* cited by examiner

APPARATUS INCLUDING ANALYZER UNIT

TECHNICAL FIELD

The present invention relates to an apparatus that includes an analyzer unit.

BACKGROUND ART

Japanese Laid-open Patent Publication No. 2015-152492 describes the provision of an analyzer apparatus capable of a high level of intensity enhancement in an enhancement spectrum, which enables target substances to be detected and analyzed with high sensitivity. This analyzer apparatus is equipped with: an electric field enhancing element including a metal layer, a translucent layer that is provided on the metal layer and transmits excitation light, a plurality of metal particles that are provided on the translucent layer and are arranged in a first direction and a second direction that intersects the first direction; a light source that irradiates the electric field enhancing element with at least one of linearly polarized light that is polarized in the first direction, linearly polarized light that is polarized in the second direction, and circularly polarized light as the excitation light; and a detector that detects the light emitted from the electric field enhancing element. In this analyzer apparatus, there is electromagnetic interaction between localized surface plasmons that are excited at the metal particles and propagating surface plasmons excited at the interface between the metal layer and the translucent layer.

Japanese Laid-open Patent Publication No. 2017-181308 describes the provision of a metal nanostructure array and an electric field enhancing device that achieves a high level of intensity enhancement for Raman scattering. In this device, a plurality of convex nanostructures are formed on a substrate at predetermined intervals, and for a metal nanostructure array used in an electric field enhancing device such as a substrate for surface-enhanced Raman spectroscopy, the base parts of the convex nanostructures are formed of metal and a polycrystalline metal film composed of crystal grains with shape anisotropy is formed from the same type of metal as the base parts or a different type of metal so as to cover the base parts.

SUMMARY OF INVENTION

One aspect of the present invention is an apparatus including: a chip containing metal bodies capable of exciting localized surface plasmon resonance at a first surface; and an analyzer unit that performs a scan of the first surface of the chip, in a state where the first surface is in contact with a sample including an analysis target substance, with a laser in at least a one-dimensional direction and records scattered light, which has been enhanced at the first surface, in association with the scan. The analyzer unit may record a spectrum of the scattered light in association with the scan or may record a fingerprint of the scattered light in association with the scan.

By scanning the first surface of the chip with a laser in at least a one-dimensional direction including at least one of a thickness direction and a planar direction, it becomes highly probable that scattered light, typically SERS (Surface Enhanced Raman Scattering) light in Raman spectroscopy that has been enhanced due to hot spots that have a high probability of being present on the first surface of the chip and are suited to detection of an analysis target substance, the presence of the analysis target substance in the sample, and a laser spot that excites the scattered light that are matched, can be acquired during a scan. By associating the SERS light with the scan, such as by synchronously recording the SERS light, it is possible to identify points on the chip that are suited to detecting the analysis target substance and to increase the detection sensitivity for the analysis target substance. Also, by statistically processing the SERS light recorded in association with the scan, it is possible to improve the measurement accuracy of the concentration of an analysis target substance contained in the sample, which improves reproducibility. The scan may move the spot, and it is also possible to perform measurement by switching between a large number of laser spots like a multifocal-type device.

The chip may include: a substrate; a first layer where concave and convex structures are repeatedly provided on the first surface of the substrate; and a second layer that contains metal bodies capable of exciting localized surface plasmon resonance and is provided via the first layer. By disposing the metal bodies, which are capable of exciting localized surface plasmon resonance, as the second layer via the first layer in which nano-level concave and convex structures are repeatedly provided, it is possible to control the intervals between the metal bodies at the nano level. This means that there is a high probability that hot spots (hot sites), which are suited to local surface plasmon excitation that forms an enhanced electric field which contributes to the measurement of the analysis target substance in the sample, will be present on the first surface of the chip.

The first layer and/or the second layer may include a structure that captures microorganisms and/or proteins. When analyzing or detecting microorganisms or proteins, by capturing the detection target, it becomes easier to acquire SERS light caused by the detection target. The first layer and the second layer may independently or cooperatively (jointly) have a micron-level structure, a submicron structure, a nanostructure, or a sub-nanostructure. This means that a structure suited to capturing microorganisms and proteins may be introduced. As examples, the first layer and the second layer may independently or cooperatively have a structure suited to capturing viruses of several tens to several hundreds of nm, a structure suited to capturing bacteria of around several µm, or a structure suited to capturing cells of several µm to several hundreds of µm. The first layer and the second layer may independently or cooperatively have a structure suited to capturing proteins that are several nm to several tens of nm and contain antibodies or the like.

The chip may include a plurality of sectors in which at least one of a configuration of the first layer and a configuration of the second layer differs. The chip may include a third layer which contains one or more affinity ligands and adheres to at least part of a surface of the metal bodies of the second layer, and the plurality of sectors may include sectors where at least one of the configuration of the first layer, the configuration of the second layer, and the affinity ligand differs. The chip may include a fourth layer that covers the second layer or covers the third layer and contains a structure that captures microorganisms and/or proteins. The fourth layer may be nanostructures using a nanomaterial such as carbon nanotubes. The fourth layer may be microstructures or nanostructures formed by a method, such as nanoimprinting or etching, on a different substrate. The fourth layer may include different structures that capture different microorganisms and proteins, either on a sector-by-sector basis or by dividing sectors.

The analyzer unit may include a unit that scans the plurality of sectors in order. The second layer may contain metal bodies respectively provided at the front ends or tips of convex portions of the first layer, and may include a region where the intervals or distances between the metal bodies are narrower than the intervals or distances between the convex portions of the first layer. The first layer may include one or more regions where the intervals between the convex portions differ. It is also possible to design a second layer that prioritizes formation of hot spots, to design a first layer that prioritizes reflection or transmission of the SERS light, and to design a first layer for the purpose of dispersion, concentration, or the like of the analysis target substances in the sample.

The analyzer unit may include a unit that irradiates (emits) the laser onto the first surface via the sample. The analyzer unit may include a unit that focuses (collimates) at least two laser beams onto a same spot (common spot) on the first surface. This facilitates control of the position of the laser spot that excites scattered light at the first surface of the chip, and makes it possible to improve the scanning accuracy. CARS (Coherent Anti-Stokes Raman Scattering, Coherent Anti-Stokes Raman Spectroscopy) analysis, SRS (Stimulated Raman Scattering) analysis, and a time-division-based CARS can be given as examples of measurement methods that use at least two laser beams (laser lights).

The sample may be a solid, may be a gas, or may be a liquid, and may have a property or shape that enables contact with the first surface of the chip. The apparatus may be a device or a monitor that detects the presence/absence and/or concentration of components in the sample being measured. The apparatus may further include a translucent (light transmitting) holder in which a fixed amount of sample is internally held or flows and that has a translucent chip mounted on or embedded in a wall surface thereof. The apparatus may further include a route through which a sample including a liquid waste (excreted liquid, effluent, drainage, waste water) from a living body flows and has the chip mounted onto and embedded in a wall surface thereof.

Another aspect of the present invention is an electric field enhancing chip including: a substrate; and metal bodies that are capable of exciting localized surface plasmon resonance and are provided on a first surface of the substrate. The chip may include a first layer and a second layer that are laminated or stacked on the substrate. Additionally, the chip may include a third layer and may include a plurality of sectors where a configuration of at least one of the layers differs.

Yet another aspect of the present invention is a method including detecting presence/absence and/or concentration of a target in a sample using the chip described above. The method includes, during detecting, recording scattered light generated by performing a scan of the first surface in a state where the first surface is in contact with a sample, with a laser in at least a one-dimensional direction, and enhanced at the first surface, in association with the scan. When the chip includes a plurality of sectors, the recording may include scanning the plurality of sectors in order.

Yet another aspect of the present invention is a program of an apparatus that uses the chip described above to detect the presence/absence and/or concentration of a target in a sample. The program (or program product) includes instructions that cause an apparatus to perform a scan of a first surface in a state where the first surface is in contact with a sample, with a laser in at least a one-dimensional direction and to record scattered light, which has been enhanced at the first surface, in association with the scan. This program (or program product) may be provided having been recorded on a computer readable recording medium.

DESCRIPTION OF EMBODIMENTS

Figure 1:
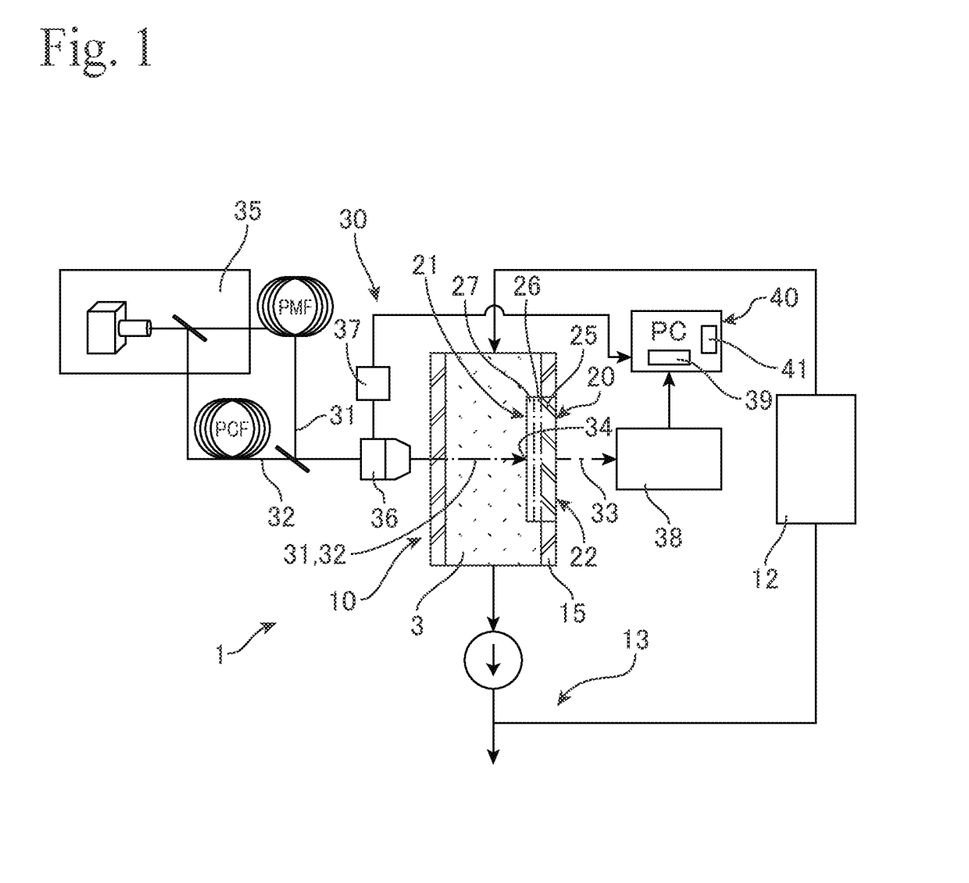
FIG. 1 is a diagram depicting one of embodiments of a measurement apparatus.

FIG. 1 depicts one of embodiments of an apparatus that measures or detects an analysis target in a sample, such as in a liquid. This measurement apparatus (detection apparatus, detector) 1 includes a translucent holder (light transmitting holder) 10 where a sample 3, which contains an analysis target (analysis target substance, or measurement target), is internally held in a predetermined amount (quantity) or flows at a predetermined flow rate, and a circulating system 13 that circulates or supplies the sample 3 between a source 12 of the sample 3 and the holder 10. The measurement apparatus 1 further includes an electric field enhancing chip (chip for detection chip, chip for measurement, measurement chip) 20, which is mounted on or embedded in one wall surface (wall) 15 of the holder 10, and an analyzer unit (analyzer, spectroscopic analyzer unit) 30, which is disposed or arranged so as to irradiate or emit lasers 31 and 32 onto a surface (first surface) 21 of the chip 20 that contacts the sample 3. One example of a spectroscopic analyzer module 30 is a Raman analyzer apparatus, and as specific examples, it is possible to use a CARS (Coherent Anti-Stokes Raman Scattering, Coherent Anti-Stokes Raman Spectroscopy) analyzer apparatus, an SRS (Stimulated Raman Scattering) analyzer apparatus, a time-division-based CARS analyzer, or the like suited to microanalysis.

The CARS analyzer unit 30 according to the present embodiment includes a laser light source 35, a head module 36 that irradiates (focuses, collimates) pump light (pump beam) 31 and Stokes light (Stokes beam) 32 obtained from the laser light source 35 via the sample 3 onto the same position (region, laser spot, or simply, spot) 34 on the surface 21 of the enhancing chip 20, a scanning unit 37 that moves the laser spot 34 formed by the pump light 31 and the Stokes light 32 across the surface 21 of the chip 20, a detection module (spectrometer) 38 that detects scattered light (surface-enhanced Raman scattering (SERS)) 33, which has been enhanced at the surface 21 of the enhancing chip 20, through the rear surface 22 of the enhancing chip 20, and an analysis control unit 39 that records the scattered light 33 detected by the detection module 38 in association with the scan and analyzes.

The analysis control unit (or simply control unit) 39 may be implemented as software (that is, a program or program product) 41 on a PC 40 equipped with computer resources including a CPU and a memory. The program 41 may be provided having been recorded on an appropriate type of memory (or recording medium) that is computer readable. The analysis control unit 39 may record the SERS light detected (measured) by the detection module 38 as a spectrum including the SERS light, may record feature components (called a "fingerprint") extracted from the spectrum, or may record in the form of information that has been compressed using an appropriate method, such as differences from a base waveform (spectrum).

The sample 3, which is in the form of a fluid and contains a liquid (which includes an aqueous solution or other solution) or a gas to be measured by the measurement apparatus 1, may be any fluid, such as a liquid, containing a substance (or analyte) to be measured, examples of which include a fluid used during a manufacturing process, a waste fluid discharged during a manufacturing process, atmospheric air, river water, liquid waste (drainage, excreted liquid, waste water), blood, serum, a bodily fluid, a culture, or an ampule liquid. The sample 3 may be matter that has solidified with the chip 20 inside or may be solid matter where the chip 20 adheres to part of the surface. The sample 3 may be a substance or form capable of contacting or tightly adhering to the surface (first surface) 21 of the chip 20.

The sample 3 may be excreted from a living body. One example of the sample 3 is a urine sample. The sample 3 may be dialysis effluent. The sample 3 may be exhaled breath (that is, exhaled gas). The measurement apparatus 1 is capable of detecting trace components contained in these fluid samples 3 using surface-enhanced Raman spectroscopy. As the laser light source 35, it is possible to use a pulse laser. As one example, a pulse laser of several kHz, such as around 5 kHz, can be used. Examples of the spectra that are enhanced and detected by this method include emission spectroscopy, fluorescence, Raman scattered light, and non-linear Raman.

Figure 2A:
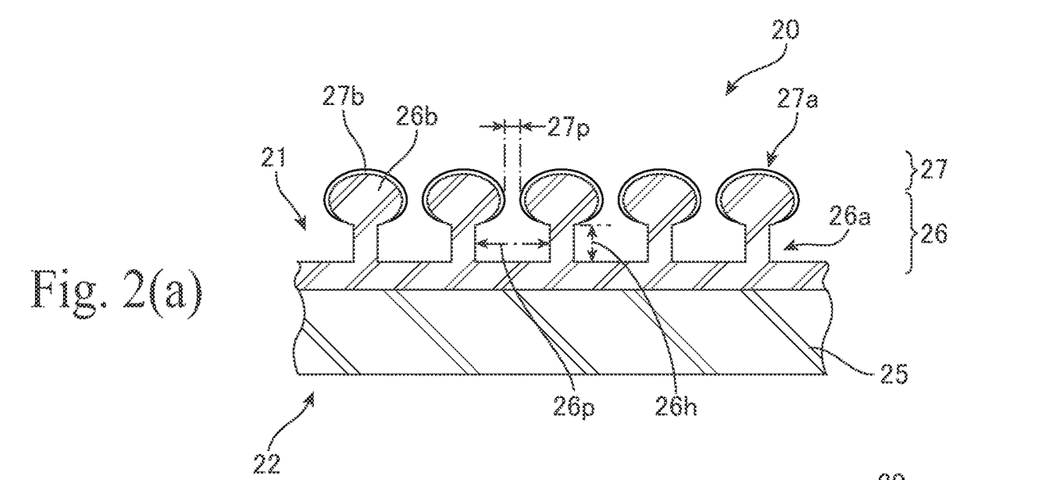
FIGS. 2(a)-2(c) are diagrams depicting a number of embodiments of an electric field enhancing chip by way of enlarged cross-sectional views.
Figure 2B:
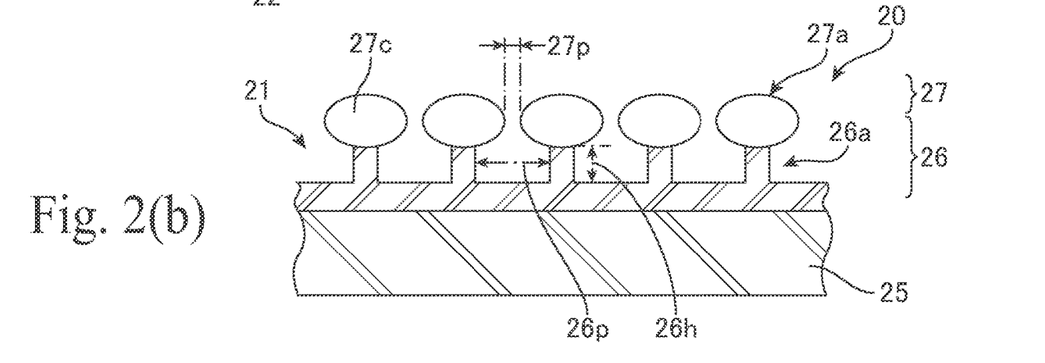
Figure 2C:
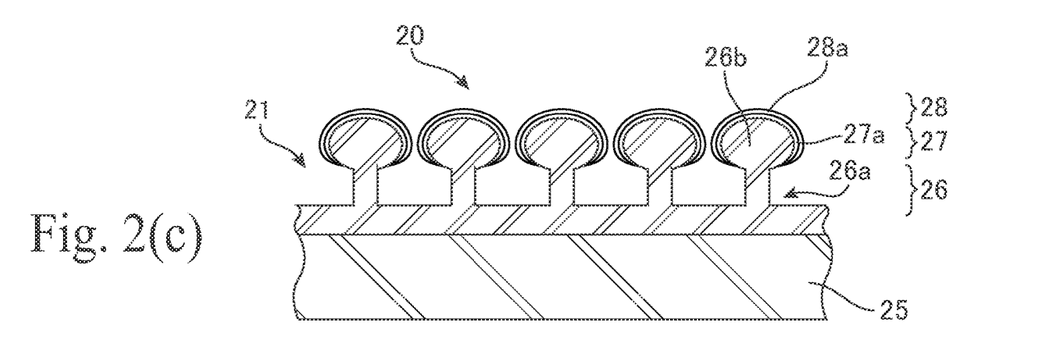

FIG. 2 depicts the structures of the electric field enhancing chip 20 by way of enlarged cross sections. The chip 20 includes a substrate 25 and a first layer 26 which is provided on the first surface (or simply "surface") 21 of the substrate 25 on the side of the substrate 25 in contact with the sample 3 that contains the analysis target. The first layer 26 includes concave and convex (concavo-convex, undulating, uneven) structures 26a that are repeatedly provided. The chip 20 further includes a second layer 27 that is stacked (layered, laminated) on the first layer 26 and contains metal bodies 27a that can excite localized surface plasmon resonance. One example of the substrate 25 is a glass plate, but it is also possible to use another material, such as a silicon substrate.

With this chip 20, the surface 21 of the substrate (base or board) 25 is irradiated with the pump light 31 and the Stokes light 32 through the sample 3, and the SERS light 33 that is emitted in the forward direction due to the incident light may be detected from or through the rear surface 22. Here, it is desirable for the substrate 25 to have sufficient transparency for the wavelength range of the SERS light 33, as one example, electromagnetic waves (light) with a wavelength of 600 to 800 nm. The substrate 25 does not have to be transparent for the wavelength range of the pump light 31 and the Stokes light 32, as one example, electromagnetic waves (light) with a wavelength of 1000 to 1300 nm. With this chip 20, it is also possible to irradiate the surface 21 of the substrate 25 with the pump light 31 and the Stokes light 32 through the sample 3 and to detect the SERS light 33 emitted in a rearward (epi-) direction due to the incident light. Also, the chip 20 may be irradiated with the pump light 31 and the Stokes light 32 through the rear surface 22 of the substrate 25. With this configuration, it is desirable for the substrate 25 to have sufficient transparency for electromagnetic waves (light) of the wavelength range of the pump light 31 and the Stokes light 32.

As the fine concave and convex structures 26a of the first layer 26, it is possible to use a resist or other highly heat-resistant resin, such as polyether sulfone, and as one example, the concave and convex structures 26a may be formed by a method suited to manufacturing nanostructures, such as nanoimprinting or etching. The concave and convex structures 26a may be micron structures, submicron structures, nanostructures, or sub-nano structures. As one example of when nanostructures are formed, the thickness of the first layer 26, that is, the height 26h of the concave and convex structures 26a may be 10 to 1000 nm or 100 to 300 nm. Also, the distance, pitch or intervals 26p of the concave and convex structures 26a may be 1 to 1000 nm, or may be 50 to 300 nm.

The metal bodies 27a of the second layer 27 are supported by the concave and convex structures 26a of the first layer 26, and are provided so as to be distanced from or floating above the substrate 25 due to the concave and convex structures 26a by a distance 26h of several tens to several hundreds of nm. The metal bodies 27a, which are electric field enhancing elements capable of exciting localized surface plasmon resonance, may be a metal such as gold, silver, copper, aluminum, platinum, chromium, nickel, palladium, tungsten, rhodium, or tellurium, or may include an alloy containing any of these metals. The metal bodies 27a may be a metalloid, such as silicon, polysilicon, gallium, arsenide, or the like, or may be a mixture containing any of these substances or an alloy of any metalloid and any of the metals mentioned above.

The individual metal bodies 27a, which are supported by the concave and convex structures 26a, may be shapes produced by extending the concave and convex structures 26a, as one example, rod shapes, or may be shapes with a predetermined volume in a direction that is perpendicular to the concave and convex structures 26a, such as spherical shapes or ellipsoidal shapes. The diameter of apex portions when the metal bodies 27a have a certain volume and are spherical or ellipsoidal may be 50 nm or less. Gaps 27p may be provided between adjacent metal bodies 27a. Gaps 27p that are suited to hot spots may be several nm in size, as one example, 10 nm or less.

As depicted in FIG. 2(a), the metal bodies 27a may be configured so that expanded apex portions 26b of the concave and convex structures 26a are covered with a thin metal film 27b with a thickness of around several nm. As depicted in FIG. 2(b), it is also possible to use a configuration where metal nanostructures 27c are supported by convex (protruding) portions of the concave and convex structures 26a. The structure of the metal bodies 27a that have a predetermined volume and are capable of controlling the gaps 27p between adjacent metal bodies 27a is not limited to a shape composed of curved surfaces, such as a sphere or ellipsoid, and may be a polyhedron or any shape with acute or obtuse corners or steps.

The first layer 26 and the second layer 27 of the chip 20 may be integrally formed of the same metal material. The first layer 26 and the second layer 27 of the chip 20 may be formed of different materials. By using a configuration where these layers 26 and 27 are separate, it is possible for the first layer 26 to have a structure that can be stably and accurately manufactured as nanostructures, and by using these nanostructures of the first layer 26 which has been stably produced, for the second layer 27 to have a metal 27a selected based on suitability as hot spots rather than stability as a structure. This means that it is possible to provide a chip 20 which as a whole is equipped with the metal 27a that is suited to hot spots and that has metal nanostructures with a stable shape. Accordingly, it is possible to provide a chip 20 capable of forming hot sites for electric field enhancement more efficiently and uniformly using metal nanostructures.

The chip 20 may include a region where the intervals 27p between the metal bodies 27a in the second layer 27 is narrower than the distance 26p between the convex portions in the first layer 26. In the second layer 27, the metal bodies 27a that are suited to enhancing an electric field can be arranged at narrow intervals (gaps, distances) 27p of nm level that are suited to forming hot spots. On the other hand, in the first layer 26, structures 26a made of a highly transparent material can be disposed at a relatively wide intervals (gaps, distances) so as to guide the scattered light 33 that has been enhanced by the second layer 27 to the rear surface side 22 of the substrate 25. Accordingly, it is possible to provide a structure that is suited to a chip 20 where the front surface 21 of the substrate 25 is irradiated with the pump light 31 and the Stokes light 32 via the sample 3 and the SERS light 33 emitted in the forward direction due to this light is detected through the rear surface 22 of the substrate 25. This configuration is also expected to suppress the transmission of the pump light 31 and the Stokes light 32, which are incident on the front surface 21, to the rear surface 22.

As depicted in FIG. 2(c), the chip 20 may further include a third layer 28 containing one or more affinity ligands 28a that are attached to at least part of the surfaces of the metal bodies 27a of the second layer 27. The affinity ligands 28a are ligands containing capture molecules including arbitrary molecules capable of binding to a plurality of target substances to be analyzed. Although antibodies, antibody fragments, recombinant antibodies, single-stranded antibodies, receptor proteins, binding proteins, enzymes, inhibitor proteins, lectins, cell adhesion proteins, oligonucleotides, polynucleotides, nucleic acids, and aptamers can be given as examples of capture molecules, the capture molecules in the present embodiment are not limited to these. The affinity ligands 28a can improve the concentration of the analysis target substances in the vicinity of the metal bodies 27a that have a nanostructure suited to enhancing an electric field, and can thereby further improve detection sensitivity for the analysis target substances.

The target (analysis target substances, detecting target) to be analyzed (or detected or measured) using the chips 20 described above are arbitrary atoms, chemical substances, molecules, compounds, compositions, microorganisms, or aggregates to be detected and/or identified. Example target substances include amino acids, peptides, polypeptides, proteins, glycoproteins, lipoproteins, nucleosides, nucleotides, oligonucleotides, nucleic acids, sugars, carbohydrates, oligosaccharides, polysaccharides, fatty acids, lipids, hormones, metabolites, cytokines, chemokines, receptors, neurotransmitters, antigens, allergens, antibodies, matrices, metabolites, cofactors, inhibitors, drugs, formulations, nutrients, prions, toxins, toxicants, explosives, agricultural chemicals, chemical weapons, biologically harmful substances, radioisotopes, vitamins, heterocyclic aromatic compounds, carcinogens, mutagens, narcotics, amphetamines, barbiturates, hallucinogens, waste products, and/or pollutants, but are not limited to these. Examples of microorganisms include viruses, bacteria, and cells, but are not limited to these.

The first layer 26 and the second layer 27 may independently or jointly (cooperatively) construct micron-level structures, submicron structures, nanostructures, or sub-nanostructures. Accordingly, by introducing a structure that physically captures the detection target using these layers 26 and 27, the detection efficiency when using the chip 20 can be further improved. As examples, the first layer 26 and the second layer 27 may independently or cooperatively have one or more structures suited to capturing a virus of several tens to several hundreds of nm, one or more structures suited to capturing bacteria of around several μm, or one or more structures suited to capturing cells of several μm to several hundreds of μm. The first layer 26 and the second layer 27 may independently or cooperatively have one or more structures suited to capturing proteins such as antibodies or the like that are several nm to several tens of nm. The first layer 26 and the second layer 27 may independently or cooperatively have one or more structures suited to capturing a particular molecule, for example, genes (DNA).

Figure 3:
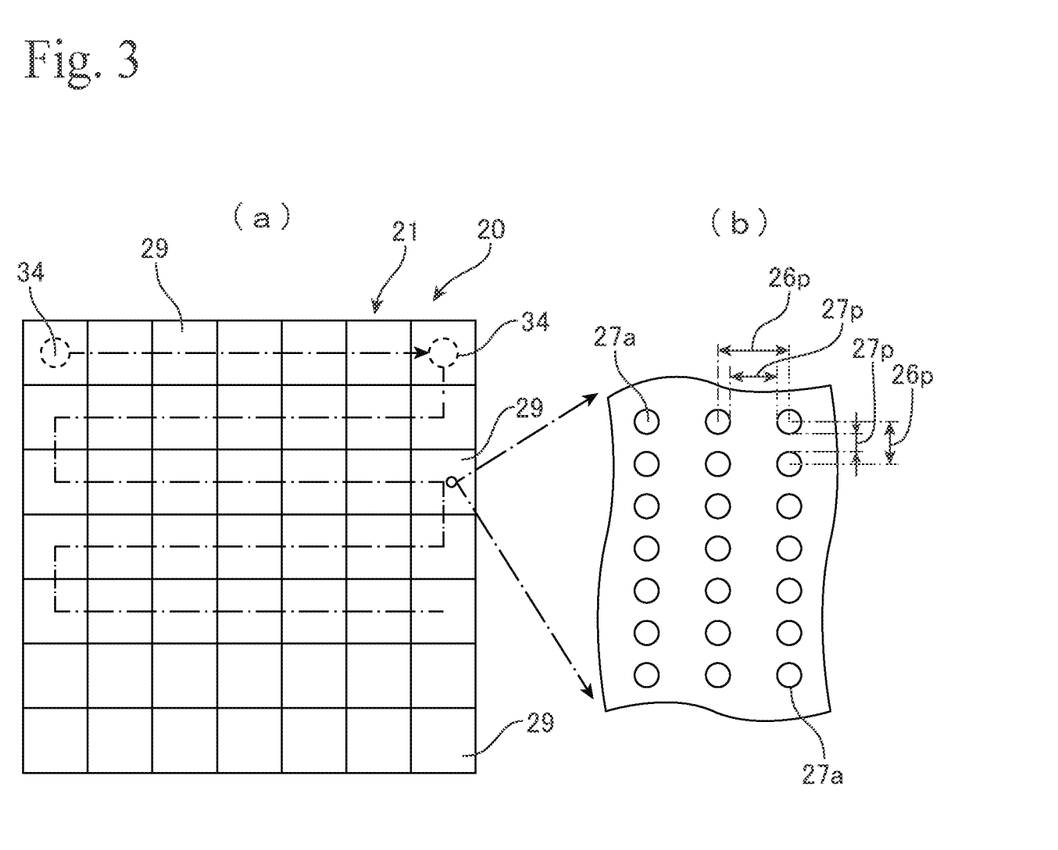
FIG. 3 is a diagram depicting one of embodiments of a surface of an electric field enhancing chip.

FIG. 3 schematically depicts the configuration of the surface 21 of the electric field enhancing chip 20. As depicted in FIG. 3(a), the chip 20 may include a plurality of sectors (areas or regions) 29 in which at least one of the configuration of the first layer 26 and the configuration of the second layer 27 differs. When the chip 20 further includes a third layer 28 containing an affinity ligand 28a, it is possible to include a plurality of sectors 29 where at least one of the configuration of the first layer 26, the configuration of the second layer 27, and the affinity ligand 28a differs.

As depicted in FIG. 3(b), the chip 20 may also include regions or sectors 29 where the intervals (gaps or pitch) 26p between the convex (protruding) portions in the concave and convex structures 26a of the first layer 26 differs, resulting in the intervals (gaps or pitch) 27p between the metal bodies 27a also differing. The intervals 27p between the metal bodies 27a and the intervals 26p between the concave and convex structures 26a may differ between a direction where the formation of hot spots is prioritized and a direction where the effect on the transmission of the scattered light 33 is prioritized. The intervals 26p and 27p may differ with respect to the direction in which the sample 3 flows, may differ with consideration to the adhesion of the analysis target substance to be measured in each sector 29, and may differ with consideration to the concentration and detection sensitivity of the analysis target substance. The intervals 26p and 27p may differ with consideration to manufacturing tolerances of the chip 20, may differ with consideration to various other factors, may differ in sector 29 units, or may differ in regions included in the sectors 29.

Enhancement of an electric field by surface plasmons is typically used in surface-enhanced Raman scattering. As causes of surface-enhanced Raman scattering, aside from the enhancement effect (electromagnetic effect) on an electric field caused by surface plasmons, a chemical effect involving chemical adsorption of molecules is also conceivable. In this case, it is believed that enhancement is due to a resonance Raman effect achieved through the charge transfer state produced between the chemically adsorbed molecules and the metal. Although it is believed that the most important factor determining the enhancement is the surface structure of the metal that produces the surface plasmons, the electric field at the surface will change or vary in various ways depending on the structure of the metal and, in the case of a fine-grained metal, will depend on the size and shape. Accordingly, the enhancement of Raman scattering can change depending on a variety of factors, such as parameters like the morphology and size of metal nanostructures, localization of the electromagnetic field, adsorption of the measurement target substances, and focusing intensity of one or more laser beams. The enhancement is also related to manufacturing tolerances of the nanostructures formed on the surface 21 of the chip 20.

For this reason, in this measurement apparatus 1, a plurality of sectors 29 with different conditions for enhancing an electric field using surface plasmons are provided on the surface 21 of the chip 20, and the analyzer unit 30 scans these sectors 29 with a laser spot 34 formed by the pump light 31 and the Stokes light 32. By providing a plurality of sectors 29 with different conditions for enhancing an electric field using surface plasmons in units of sectors 29, surface-enhanced Raman scattered light (SERS) 33, which is related to the measurement target substance or is unique to each measurement target substance, can be obtained with a high probability in sector 29 units (sector-by-sector basis). The analyzer unit 30 (that is, the control unit 39) records the SERS light 33 in association with the scan of the surface 21 of the chip 20, for example, in synchronization with the scanning position or timing, and by doing so, it is possible to identify specify timing and/or positions indicating hot spots, which are suited to detecting the measurement target substances contained in the sample 3, in units of the sectors 29 and also in units of the positions of spots 34 formed in the sectors 29.

This means the measurement apparatus 1 is capable of detecting the measurement target substances contained in the sample 3 with high accuracy and also with high reproducibility (repeatability) using the chip 20 that is provided with a plurality of sectors 29. Also, the analyzer unit 30 (the control unit 39) may have a function of statistically processing the SERS light 33 that has been recorded in association with a scan. This makes it possible to improve the measurement accuracy of the concentration of the analysis target substances contained in the sample 3 and to also improve the reproducibility. The measurement apparatus 1 may include a cell 10 capable of controlling the volume or flow rate of the sample 3 during measurement, which makes it possible to improve the accuracy of quantitative measurements.

The scanning direction may be controlled by the analysis control unit 39 of the analyzer unit 30 via the scanning unit 37. The scanning direction may be one-dimensional or two-dimensional along the arrangement of sectors 29 on the chip 20. In addition, the state of the intervals between the metal bodies 27a of the second layer 27, the form or shape of the metal bodies 27a, adhesion of the measurement target substances, and the like may change or vary according to the thickness direction (depth direction, longitudinal direction) of the chip 20. Accordingly, a scanning direction may also be set in the thickness direction of the chip 20, and the analyzer unit 30 may have a function of scanning in three-dimensional directions.

As the method of moving (scanning) the laser spot 34 with the scanning unit 37, it is possible to physically move the head 36, or the optical path may be controlled using a polygon mirror or a micromirror device. The analyzer unit 30 may also use a multifocal-type head 36 and scan by switching between a large number of laser spots.

The SERS light 33 obtained at the surface 21 of the chip 20 may be detected as reflected light (backscattered light, Epi-light) from the surface 21 of the chip 20. In the apparatus 1 according to the present embodiment, by making the substrate 25 of the chip 20 transparent for the SERS light 33, it becomes possible to detect the SERS light 33 transmitted through the chip 20, that is, forward scattered light, using the spectrometer (light detector) 38. By detecting the SERS light 33 that has been transmitted, it is possible to suppress a decrease in intensity due to the SERS light 33 propagating in the sample 3 and the generation of noise due to interaction with the sample 3, which makes it possible to measure the measurement target substances even more accurately.

As described earlier, the present apparatus 1 enables a highly sensitive and quantitative method of measurement by increasing signal intensity with surface plasmon polaritons that are directional and are produced using laser beams. A typical method that uses surface plasmon polaritons detects only reflected light produced by omnidirectional scattering. The present method utilizes nanostructures which are formed on a transparent substrate (or base) 25 as an electric field enhancing device (chip) 20 and are uniform as a whole or are uniform in sector 29 units (sector basis). In addition, by adjusting the focal sizes of exiting lights with high directivity to appropriate sizes, it is possible to achieve a high utilization efficiency of the excited light to efficiently detect an enhanced signal as reflected light and also as transmitted light. In addition, by using the chip 20 provided with the translucent (light transmissive) substrate 25, the present method is capable of detecting the SERS light 33 generated at the surface 21 using the detector 38 through the rear surface 22 where the distance is constant and without the SERS light 33 passing through the solvent (sample) 3. This means that the sensitivity and reproducibility (repeatability) of the SERS light 33 obtained during measurement are improved. Accordingly, it is possible to perform reproducible (repeatable) and quantitative spectroscopic measurements.

In particular, when CARS is used as the excited light, an increase in intensity of $10^6$ to $10^7$ times is expected, and a further enhancement of the signal by surface plasmon polaritons of $10^2$ to $10^{12}$ times is expected. The light to be measured is not limited to CARS, and may be induced stimulated Raman scattering (SRS), coherent Stokes Raman scattering (CSRS), or the like.

Note that when irradiation with a laser over an extended period is required, a resin with high heat resistance (polyether sulfone or the like) may be used for the resist that forms the first layer 26. When durability is required, the metal surfaces may be coated (with silica glass or the like). The appropriate wavelength range may be adjusted by changing the nanostructures and/or changing the thickness of the silica glass layer on the metal surfaces. Since the chip 20 including the substrate 25 also serves as an output source of CARS light or Raman light, it is desirable to use materials whose outputted spectra do not overlap the spectra (fingerprint regions) of the measurement targets. In particular, since the substrate 25 makes up the majority of the volume of the chip 20, it is desirable for the substrate 25 to be a substance that does not overlap the fingerprint region, and effective for the substrate 25 to be a glass substrate as opposed to a silicon substrate.

Figure 4:
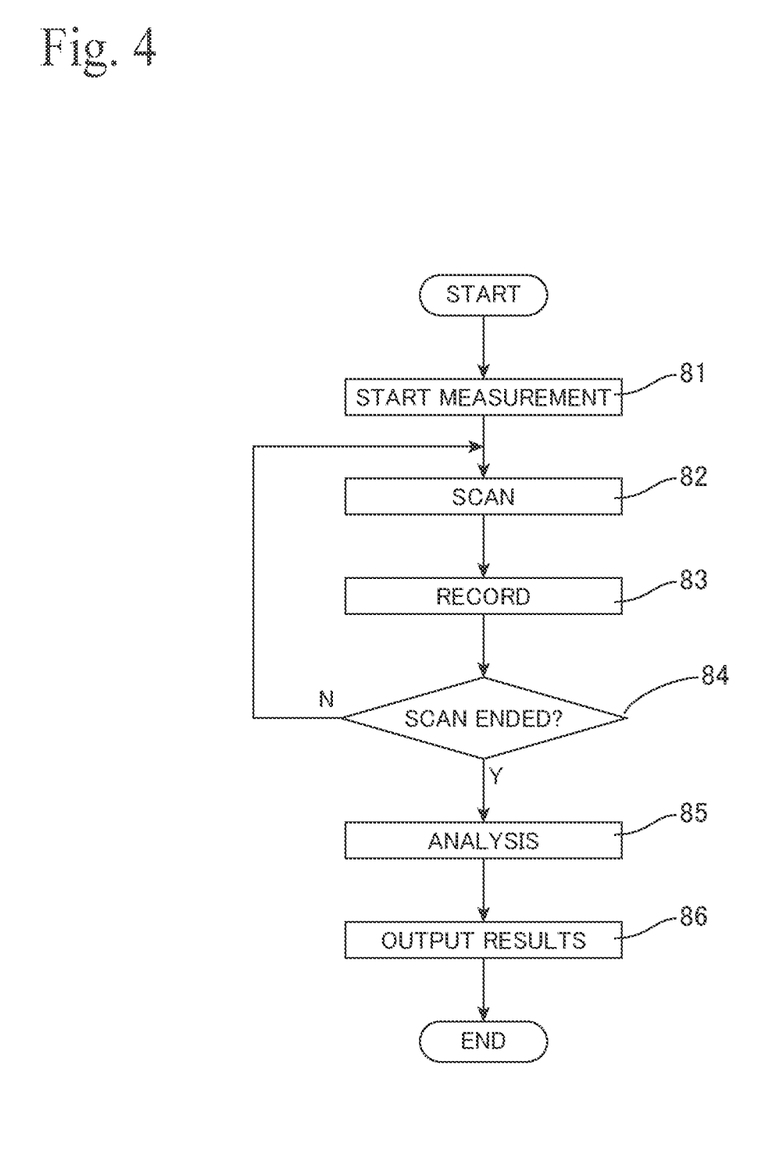
FIG. 4 is a flowchart depicting one of embodiments of a measurement method.

FIG. 4 depicts, by way of a flowchart, an example measurement method that uses the chip 20 in the measurement apparatus 1. This measurement method may be provided by a program 41 as a control method of the measurement apparatus 1. When the measurement of the sample 3 has started in step 81, in step 82, the analysis control unit 39 scans the plurality of sectors 29 provided on the first surface 21 of the chip 20 in a predetermined pattern with laser light (that is, the pump light 31 and the Stokes light 32) using the scanning unit 37. Together with this, in step 83, the analysis control unit 39 measures, using the detection module 38, the scattered light (SERS light) 33 that has been enhanced in each sector 29 of the first surface 21 and records the detected scattered light 33 in association with the scan.

In step 82, if the chip 20 is provided with a plurality of sectors 29 in one-dimension, as one example, in a row, the scanning unit 37 may continuously move the pump light 31 and the Stokes light 32 in the one-dimensional direction at a constant speed. The scanning unit 37 may intermittently move the pump light 31 and the Stokes light 32 so that the spot 34 is continuously formed for a predetermined time at the center of each sector 29 or at a predetermined position. If the chip 20 is provided with a plurality of sectors 29 in two dimensions, the scanning unit 37 may move the pump light 31 and the Stokes light 32 in two dimensions continuously or intermittently at a constant speed, or may move the light continuously or intermittently in three dimensions.

In step 83, the analysis control unit 39 may record the spectrum of the SERS light 33 obtained by the detection module 38, or the intensity of a predetermined wavelength, in association with the scan, as examples in association with the positions or identification information of the sectors 29 where the SERS light 33 is obtained. Detection results for the SERS light 33 may be recorded in association with more detailed positions of the spot 34 that moves inside the sectors 29.

When a scan of the sectors 29 provided on the surface 21 of the chip 20 has been completed in step 84, in step 85 the analysis control unit 39 analyzes the detection result of the SERS light 33 obtained by the scan. All of the sectors 29 provided on the surface 21 of the chip 20 may be scanned, or a limited number of sectors 29 that are decided in advance by pre-measurement, a test measurement, or the like may be scanned before proceeding to the analysis process. Out of the scanning results, the analysis control unit 39 may select and analyze the SERS light 33 that has an intensity or spectrum suited to quantitative or qualitative measurement of a measurement target substance. The control unit 39 may statistically process the scanning results to obtain the presence/absence and/or concentrations of measurement target substances.

In step 86, the analysis control unit 39 outputs the analysis result to an application on a higher level. As one example, if the measurement apparatus 1 is a urine monitoring apparatus or part of one, by using the chip 20, the measurement apparatus 1 can simultaneously detect multiple components including uric acid, urea, and creatinine, which are trace components in urine, with high sensitivity. This makes it possible for example for an application running on the monitoring apparatus to give health management advice to the monitored user based on the urine analysis result of the measurement apparatus 1.

Figure 5:
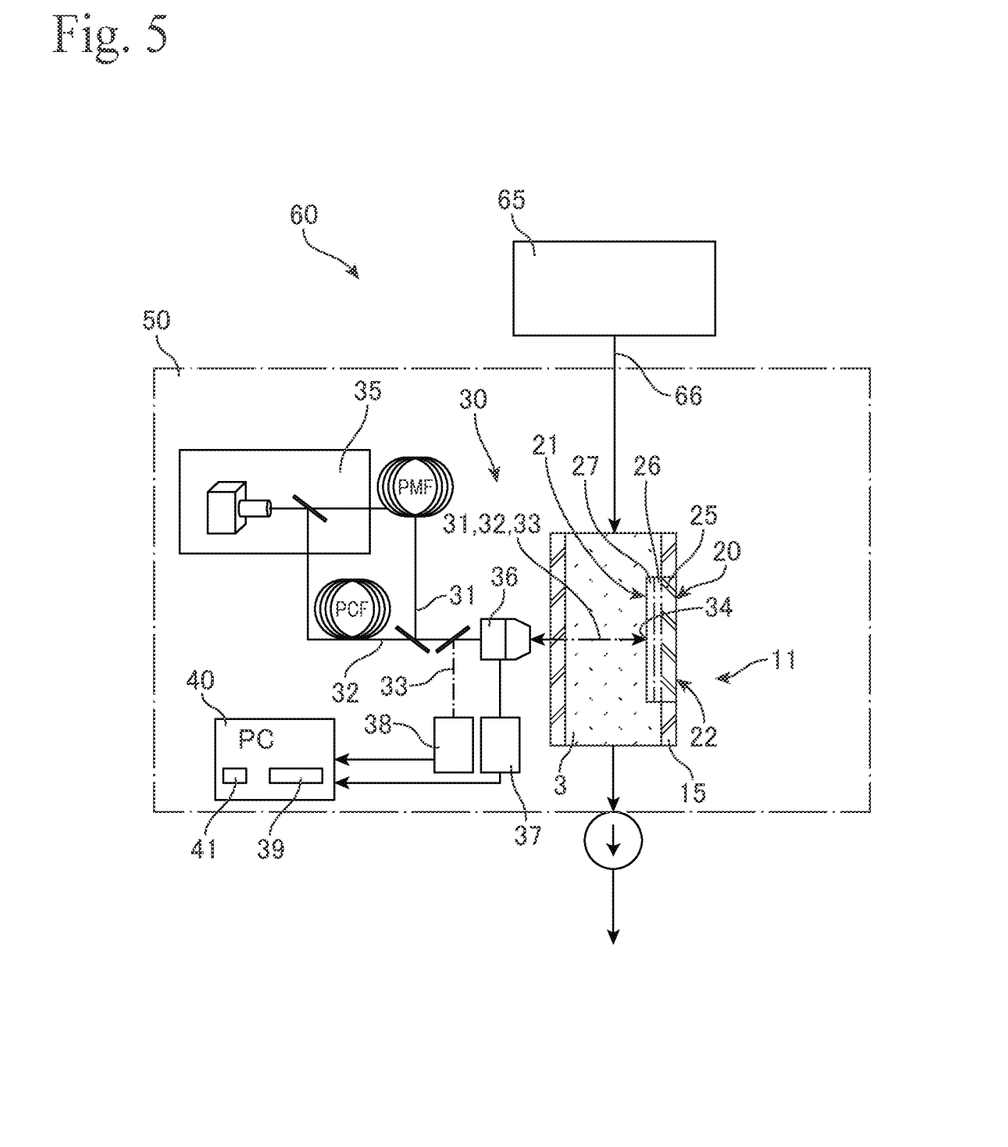
FIG. 5 is a diagram depicting another embodiment of an apparatus including a chip.

FIG. 5 depicts different embodiment of apparatus that uses the chip 20 to measure analysis targets present in a sample. This apparatus 60 includes a route (or tube or pipe) 11 through which a sample 3 including excreted liquid (liquid waste) 66 from a living body 65 such as a human body flows, with the chip 20 being attached to a part of a wall surface 15 of the route 11 so that the first surface 21 contacts the sample 3. The apparatus 60 includes a monitoring apparatus 50 that irradiates the chip 20 with one or more laser lights (laser beams) to measure the presence/absence and/or concentration of an analysis target substance (measurement target substance) contained in the sample 3. The monitoring device 50 includes the analyzer unit 30 that irradiates (focuses, collimates) the pump light 31 and the Stokes light 32 onto the chip 20 and acquires the scattered light (surface-enhanced Raman scattering or SERS) 33 that has been enhanced at the surface 21 of the chip 20. The basic configuration of this analyzer unit (spectrum analyzer unit) 30 is the same as the analyzer unit 30 included in the measurement apparatus 1 described earlier.

The analyzer unit 30 in this embodiment is a type that detects SERS light (which is backward CARS, Epi-CARS) 33 that is outputted to the opposite (counter) direction of the pump light 31 and the Stokes light 32 incident on the chip 20. The head module 36 also functions as a module that collects the SERS light 33 generated at the surface 21 of the chip 20.

One example of the excreted liquid (waste liquid) 66 from the living body 65 is urine mentioned earlier. Another example of waste liquid 66 is effluent (dialysis effluent) discharged from the human body via the blood purifier (dialyzer) of a dialysis apparatus. The effluent monitor 50 can detect the concentration of a predetermined substance in the effluent 66 (for example, the concentration of a substance such as urea or uric acid), and can accurately identify the end of a dialysis treatment.

These apparatuses and methods are suited to applications that measure a liquid sample 3, and instead of having the fluid flow by, or held in, the cell 10, it is also possible to perform measurement with the chip 20 inserted into a flow (line) 11. These apparatuses and methods enable highly sensitive simultaneous detection of multiple components including uric acid, urea, and creatinine in aqueous solutions (such as bodily fluids, dialysate, effluent, food components, and other aqueous solution components). During measurement, calibration may be performed for measurement target substances in anticipation of errors.

Figure 6:
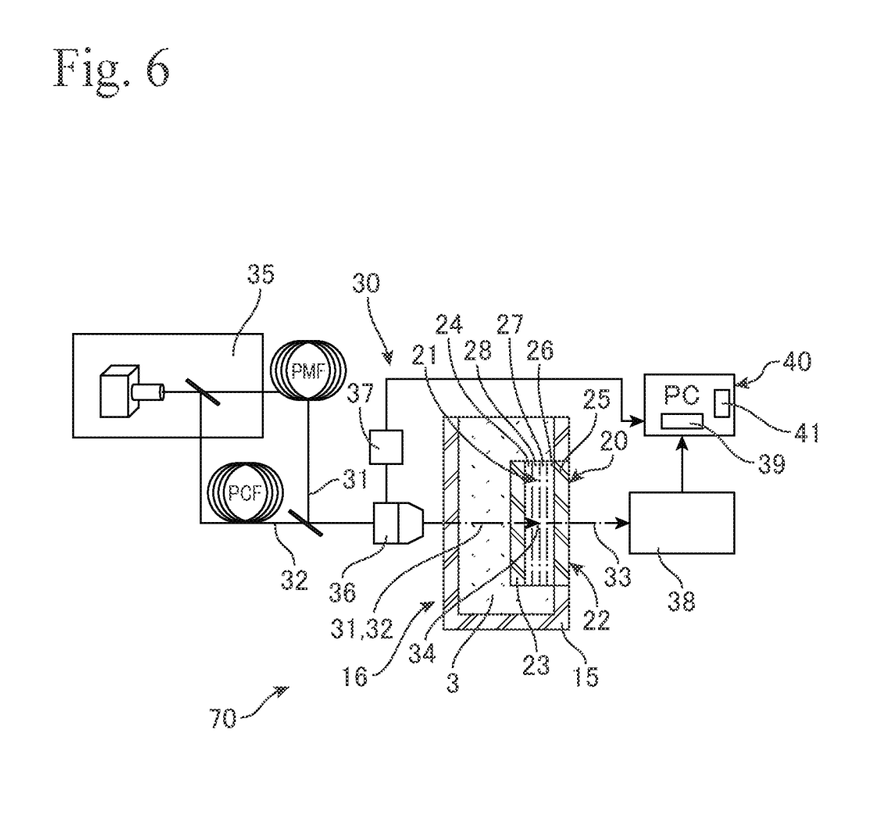
FIG. 6 is a diagram depicting yet another embodiment of an apparatus including a chip.

FIG. 6 depicts an example of a virus testing apparatus that uses the chip 20. This apparatus 70 is an apparatus (platform) that places a liquid (test liquid or sample) 3 containing an analyte collected from a human body or the like into a translucent vessel 16 that has the chip 20 mounted on a part of a wall surface 15 and identifies viruses contained in the sample 3. The sample 3 may be a liquid obtained by culturing the analyte. On top of the substrate 25, the chip 20 includes, in addition to the first layer 26, second layer 27 and the third layer 28 described earlier, a fourth layer 24 that contains nanostructures for capturing viruses. The chip 20 according to this embodiment includes a second substrate 23, which has sufficient transparency (light transmissive) for the pump light 31 and the Stokes light 32, and a fourth layer 24, which is formed on the second substrate 23 and contains structures, such as undulations or concave and convex of several nm to several hundred nm or several tens of nm, that are suited to capturing viruses. The first substrate 25 and the second substrate 23 are laminated or stacked so as to sandwich these layers. The fourth layer 24 may contain nanostructures using a nanomaterial such as carbon nanotubes and may be configured so as to be laminated or layered on the third layer 28 or the second layer 27 without using the second substrate 23.

In the virus detection apparatus (virus detection platform) 70, the virus contained in the sample 3 is captured by the fourth layer 24 of the chip 20, and by irradiating (focusing, collimating) the pump light 31 and the Stokes light 32 onto the chip 20, CARS light (scattered light) relating to the structure or components constructing the virus can be detected as scattered light (surface-enhanced Raman light, SERS) 33 that has been enhanced at the surface (first surface) 21 sandwiched between the two substrates 25 and 23 of the chip 20. The virus detection apparatus 70 can optically detect the presence/absence and/or concentration of a virus. This means that the presence/absence of a virus and/or the concentration of the virus can be detected (measured) with high accuracy without destroying the virus during detection or mixing the components constituting the virus.

The virus detection apparatus 70 includes an analyzer unit (spectrum analyzer unit) 30, which has the same basic configuration as the analyzer unit 30 included in the measurement apparatus 1 described earlier. The virus detection apparatus 70 is capable of acquiring SERS light 33, which indicates one or a plurality of viruses that have already been identified, or an unknown virus, and by comparing with the fingerprints of known viruses, the presence and concentration of these viruses can be identified in real time. Also, for an unknown virus, by comparing an obtained fingerprint with the fingerprints of known viruses, it is possible to determine the type, danger, and the like of the virus more quickly. The virus detection apparatus 70 has a simple configuration and can be made compact, and can be provided as an easily portable apparatus.

The chip 20 may include structures where SERS light 33 including fingerprints for identifying viruses respectively can be easily obtained in units of sectors (or regions or segments) 29, and the fourth layer 24 may include structures that facilitate the capturing of viruses to be detected. Structures that capture viruses may also be provided in the first layer 26 and/or the second layer 27. By forming the first layer 26 and the second layer 27, whose main purpose is to provide a configuration suited to hotspots, and the fourth layer 24 whose main purpose is to capture viruses, using different layers, it is possible to provide a chip 20 with one or more structures that are more suited to the respective purposes. In addition, by providing structures that physically capture the target viruses together with or separately to the affinity ligands 28a, it is possible to detect the targets more quickly and more accurately.

It is also possible to provide a cell analysis platform with a configuration that captures predetermined cells in place of the above configurations that capture viruses, and to provide a bacteria analysis platform with a configuration that captures predetermined bacteria. It is also possible to provide an antibody detection platform with a configuration for capturing a predetermined protein including an antibody, and a DNA analysis platform for capturing and analyzing genes.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. An apparatus comprising:
a chip containing metal bodies capable of exciting localized surface plasmon resonance at a first surface of the chip; and
an analyzer that performs a scan of the first surface of the chip, in a state where the first surface is in contact with a sample that includes target substances, by guiding a laser travelling at least in a thickness direction of the chip and records scattered light, which has been enhanced at the first surface, in association with the scan,
wherein the analyzer includes an acquiring device that performs the scan along the thickness direction in a configuration of the first surface of the chip that varies in the thickness direction, and wherein conditions of adhesion of the target substances to be measured vary in the thickness direction of the first surface of the chip, and
wherein the scan is performed by moving a common spot focused with at least two laser beams to scan the configuration in the thickness direction on the first surface, and acquires the scattered light excited by the at least two laser beams.

2. The apparatus according to claim 1,
wherein the chip includes:
a substrate;
a first layer where concave and convex structures are repeatedly provided on the first surface of the substrate; and
a second layer that contains the metal bodies and is provided via the first layer.

3. The apparatus according to claim 2,
wherein the first layer and/or the second layer includes a structure that captures microorganisms and/or proteins.

4. The apparatus according to claim 2,
wherein the chip includes a plurality of sectors in which at least one of a configuration of the first layer and a configuration of the second layer differs.

5. The apparatus according to claim 2,
wherein the chip includes a third layer which contains an affinity ligand and adheres to at least part of a surface of the metal bodies of the second layer, and includes a plurality of sectors where the affinity ligand differs.

6. The apparatus according to claim 5,
wherein the chip includes a fourth layer containing a structure that captures microorganisms and/or proteins.

7. The apparatus according to claim 4,
wherein the analyzer includes a unit that scans the plurality of sectors in order.

8. The apparatus according to claim 2,
wherein the second layer contains metal bodies that are respectively provided on front ends of convex portions of the first layer and includes regions where intervals between the metal bodies are narrower than intervals between the convex portions of the first layer.

9. The apparatus according to claim 8,
wherein the first layer includes regions where the intervals between the convex portions differ.

10. The apparatus according to claim 1,
wherein the analyzer includes a unit that irradiates the laser onto the first surface via the sample.

11. The apparatus according to claim 1,
wherein the scattered light includes one of a Coherent Anti-Stokes Raman Scattering (CARS), a stimulated Raman scattering (SRS) and a coherent Stokes Raman scattering (CSRS).

12. The apparatus according to claim 1,
further comprising a holder in which a fixed amount of a sample is internally held or flows and has the chip mounted on or embedded in a wall surface thereof.

13. The apparatus according to claim 1,
further comprising a route through which a sample including a liquid waste from a living body flows and has the chip mounted on or embedded in a wall surface thereof.

14. The apparatus according to claim 1,
wherein the acquiring device performs the scan in three-dimensional directions by the at least two laser beams.

15. The apparatus according to claim 1,
wherein the configuration of the first surface of the chip includes concave and convex structures with a height of at least 100 nm.

16. The apparatus according to claim 1, wherein the first surface of the chip includes micron structures that varies in the thickness direction, and wherein the scan is performed by moving a common spot focused with at least two pulsed laser beams to scan the configuration in the thickness direction on the first surface, acquiring the scattered light excited by the at least two pulsed laser beams, and recording the scattered light in synchronization with a scanning position in the thickness direction.

17. A method comprising detecting presence/absence and/or concentration of a target in a sample using a chip, wherein the chip contains metal bodies capable of exciting localized surface plasmon resonance at a first surface, wherein the detecting includes recording scattered light generated by performing a scan of the first surface in a state where the first surface is in contact with a sample that includes target substances, by guiding a laser travelling at least in a thickness direction of the chip, and enhanced at the first surface, in association with the scan, and the recording includes performing the scan along the thickness direction in a configuration of the first surface of the chip that varies in the thickness direction, and wherein conditions of adhesion of the target substances to be measured vary in the thickness direction of the first surface of the chip, wherein the scan is performed by moving a common spot focused with at least two laser beams to scan the configuration in the thickness direction on the first surface, and acquiring the scattered light excited by the at least two laser beams.

18. The method according to claim 17, wherein the chip includes a substrate, a first layer where concave and convex structures are repeatedly provided on the first surface of the substrate, a second layer that contains the metal bodies and is provided via the first layer, and a plurality of sectors where at least one of a configuration of the first layer and a configuration of the second layer differs, and the recording includes scanning the plurality of sectors in order.

19. The method according to claim 17, wherein the chip includes a substrate, a first layer where concave and convex structures are repeatedly provided on the first surface of the substrate, a second layer that contains the metal bodies and is provided via the first layer, a third layer which contains an affinity ligand and adheres to at least part of a surface of the metal bodies of the second layer, and a plurality of sectors where at least one of a configuration of the first layer, a configuration of the second layer, and the affinity ligand differs, and the recording includes scanning the plurality of sectors in order.

20. The method according to claim 17, wherein the acquiring the scattered light includes further performing the scan in three-dimensional directions by the at least two laser beams.

21. The apparatus according to claim 17, wherein the configuration of the first surface of the chip includes concave and convex structures with a height of at least 100 nm.

22. A nontransitory computer readable medium encoded with a program product of an apparatus that uses a chip to detect presence/absence and/or concentration of a target in a sample, wherein the chip contains metal bodies capable of exciting localized surface plasmon resonance at a first surface, and the program comprises instructions that cause the apparatus to perform a scan of the first surface in a state where the first surface is in contact with a sample that includes target substances, by guiding a laser travelling at least in a thickness direction of the chip and to record scattered light, which has been enhanced at the first surface, in association with the scan, wherein the instructions include instructions that cause the apparatus to perform the scan along the thickness direction in a configuration of the first surface of the chip that varies in the thickness direction, and wherein conditions of adhesion of the target substances to be measured vary in the thickness direction of the first surface of the chip, and wherein the scan is performed by moving a common spot focused with at least two laser beams to scan the configuration in the thickness direction on the first surface, and acquiring the scattered light excited by the at least two laser beams.

23. The computer readable medium according to claim 22, wherein the instructions include instructions that cause the apparatus to perform the scan in three-dimensional directions by the at least two laser beams.

24. The apparatus according to claim 22, wherein the configuration of the first surface of the chip includes concave and convex structures with a height of at least 100 nm.

* * * * *